United States Patent [19]
Matsuyama et al.

[11] 4,257,533
[45] Mar. 24, 1981

[54] METHOD OF DISCHARGING SLURRY BY VARYING VALVE OPENINGS

[75] Inventors: Kiyoshi Matsuyama; Shozi Ishikawa; Seizi Hirata; Tsutomu Ogura, all of Niihama, Japan

[73] Assignee: Sumitomo Chemical Company, Limited, Osaka, Japan

[21] Appl. No.: 21,280

[22] Filed: Mar. 16, 1979

[30] Foreign Application Priority Data

Mar. 17, 1978 [JP] Japan .................................. 53-31568

[51] Int. Cl.$^3$ ............................................... B67B 7/00
[52] U.S. Cl. .................................. 222/1; 137/624.15; 222/70; 222/504
[58] Field of Search ...................... 137/624.13, 624.15; 222/1, 420, 421, 559, 504, 70

[56] References Cited
U.S. PATENT DOCUMENTS 3,061,198 10/1962 Kerr et al. .................. 137/624.13 X
3,444,892 5/1969 Doyle et al. ..................... 137/624.15
3,476,128 11/1969 Barker .......................... 137/624.15 X
4,098,247 7/1978 Konishi et al. ............. 137/624.15 X Primary Examiner—David A. Scherbel
Attorney, Agent, or Firm—Sughrue, Rothwell, Mion, Zinn and Macpeak

[57] ABSTRACT

A slurry containing polymer particles having an average particle diameter of 0.1 to 1 mm suspended therein is discharged smoothly from a discharge valve without valve clogging by operating the valve such that the degree of valve opening is set within a range II for a valve operating time $t_1$ and within a range III for a valve operating time $t_2$; the time $t_1$ being from 5 to 60 seconds, the time $t_2$ being from 1 to 10 seconds, the range II being a range of valve openings at which the valve is gradually clogged with the polymer particles discharged, and the range III being a range of valve openings at which the valve permits continuous discharge without clogging.

6 Claims, 9 Drawing Figures

METHOD OF DISCHARGING SLURRY BY VARYING VALVE OPENINGS

BACKGROUND OF THE INVENTION

1. Field of the Invention

This invention relates to a method for discharging a polymer slurry. More specifically, it pertains to a method of smoothly and substantially continuously discharging a polymer slurry formed in a continuous polymerization process from a polymerization vessel or a washing vessel and the like used in a post-treatment step.

2. Description of the Prior Art

According to conventional techniques, so called low or medium pressure process, olefin polymers such as ethylene polymers or propylene polymers are generally obtained by the continuous slurry polymerization of olefins such as ethylene or propylene in a solvent at a temperature below the melting point of the resulting polymer, i.e. below 100° C., in the presence of a Ziegler-Natta catalyst system or a metal oxide-type catalyst system. The polymer obtained by the polymerization precipitates in the solvent to form a polymer slurry. Paraffinic or olefinic hydrocarbons having at least 3 carbon atoms are generally used as the solvent. The polymer formed commercially generally has an average particle diameter of 0.1 to 1 mm and a bulk density of 0.3 to 0.53 kg/liter although its properties differ depending upon the catalyst and polymerization temperature employed. The shape and particle size distribution of the polymer usually differ greatly depending upon the catalyst used. The concentration of the polymer in the polymer slurry is usually 200 to 1,000 g/liter of solvent. Needless to say, the long-term smooth operation of a polymer manufacturing plant depends greatly upon the ability to prevent clogging of valves and piping systems in handling the polymer slurry.

In discharging a polymer slurry, it has been the previous practice to use a ball valve, a butterfly valve, a flash valve directly inserted into the main body of the vessel as shown in FIG. 1, or an angle valve as shown in FIG. 2 adapted to prevent clogging by the polymer as a discharge valve, and repeating the complete opening and complete closing of the valve intermittently over a short period of time. However, since according to the method involving operating the valve intermittently, a large quantity of polymer slurry is drawn off at the time of discharge, the condition of the inside of the polymerization vessel or washing vessel located upstream is disturbed, and the condition of the inside of the polymer slurry receiving tank on the downstream side also fluctuates greatly and a load is exerted on it. To absorb these fluctuations, the capacities of the receiving tank and the like on the downstream side must be increased. This inevitably leads to an increase in the cost of equipment and in installation space.

In an attempt to overcome these disadvantages, suggestions were made to operate the valves stably and continuously. Some were successful in short-term operations, but it was difficult to perform long-term operations without any trouble. In particular, when the flow rate is small, the degree of valve opening must be decreased to a small size and as a result it is difficult for the polymer particles to pass through the valve and clogging occurs within a short period of time.

SUMMARY OF THE INVENTION

It is an object of this invention to make possible the long-term, substantially continuous discharge of a polymer slurry without clogging by performing a special operation of conventional slurry discharge valves.

According to this invention, there is provided a method for discharging through a discharge valve a slurry containing polymer particles having an average particle diameter of 0.1 to 1 mm suspended therein, wherein the the valve is so operated that the degree of valve opening is set within a range II for a valve operating time $t_1$ and within a range III for a valve operating time $t_2$ and this operation is repeated periodically; wherein the time $t_1$ is from 5 to 60 seconds, the time $t_2$ is from 1 to 10 seconds, the range II is a range of valve openings at which the valve is gradually clogged with the polymer particles discharged, and the range III is a range of valve openings at which the valve permits continuous discharge without clogging.

DETAILED DESCRIPTION OF THE INVENTION

Figure 1:
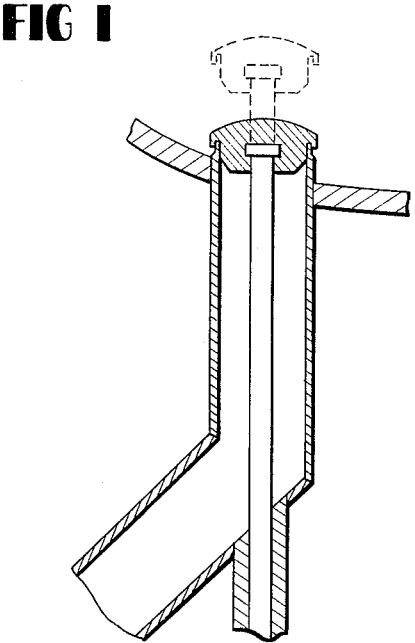
FIG. 1 shows the structure of a slurry-discharging flash valve inserted directly into the main body of a vessel.
Figure 2:
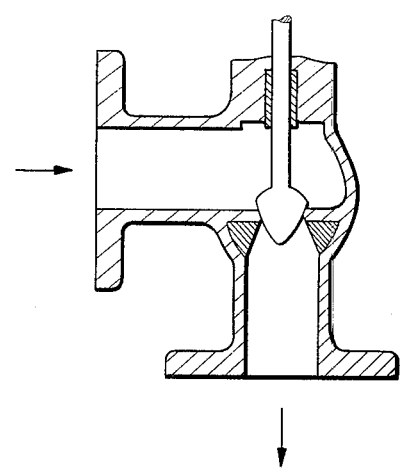
FIG. 2 shows the structure of a slurry-discharging angle valve adapted to prevent clogging by the polymer.
Figure 3:
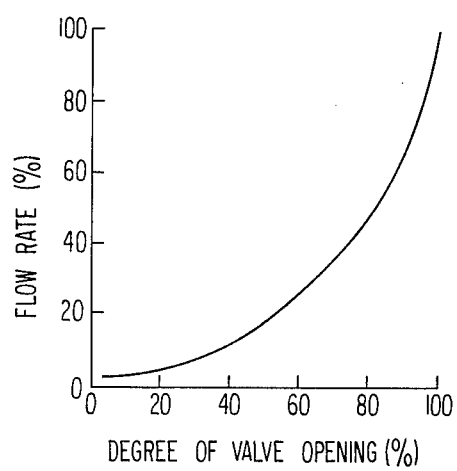
FIG. 3 is a diagram showing the relation between the degree of the valve opening and the flow rate, which is characteristic of an angle valve used for discharging a polymer slurry.

The characteristics of angle valves generally used for discharging polymer slurries are of the equal percent type as shown in FIG. 3. The relationship between the degree of the valve opening and the state of discharge of a polymer slurry is greatly affected by the size of the valve, the properties of the slurry (e.g., the particle size, concentration, viscosity) and other factors, and it is difficult to describe it in general terms. As a model, the relationship is shown in FIG. 4.

Figure 4:
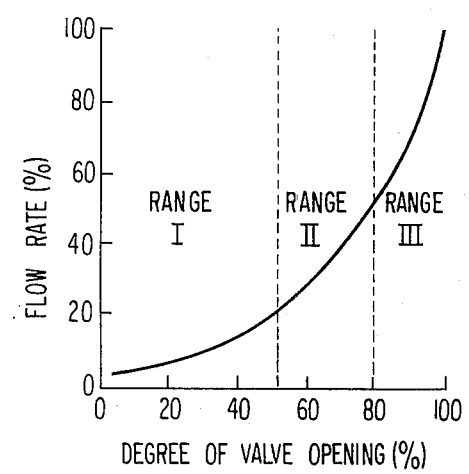
FIG. 4 represents a model of the ranges of the amount of the slurry discharged shown in FIG. 3.

Referring to FIG. 4, in range I, the degree of valve opening is too small for discharging the polymer slurry. Accordingly, the polymer particles in the slurry clog almost immediately (within 5 seconds). In range III, the degree of valve opening is large, and clogging of the valve by the polymer particles does not appreciably take place. Hence, no special consideration is required. In practice, however, the valve cannot be constantly operated in range III and still used as a control valve since operating it always within the range III tends to cause excessive discharge of the polymer slurry, and therefore, this operation is substantially impossible. In the range II, the degree of valve opening is such that the slurry can be discharged. However, the concentration of the polymer particles is generally high, and the polymer particles interfere with one another. Accordingly, they are difficult to discharge continuously without clogging, and the valve will be blocked with time. At the earliest, the valve will begin to clog in 5 to 10 seconds, and can no longer discharge a uniform slurry, until finally it is completely clogged.

According to the method of this invention, a slurry of uniform composition is discharged by improving the operation of the valve when the average flow rate of the slurry is mainly within range II.

The discharge valve that can be used in this invention may be any type of valve which can permit continuous discharge of a polymer slurry, when it is fully open. An angle valve is suitably used. Preferably, the angle valve has such a structure that solid matter is prevented from accumulating or precipitating at the main body portion of the valve. However, the type and structure of the discharge valve can be selected by those skilled in the art as required.

Slurries to which the present invention can be favorably applied are those containing particles of polyolefins (e.g., propylene polymers, ethylene polymers) having a particle diameter of 0.1 to 1 mm suspended in a paraffinic hydrocarbon having 3 to 7 carbon atoms (e.g., butane, pentane, hexane, and heptane) or an olefinic hydrocarbon (e.g., propylene, butene-1, pentene-1, hexane-1) as a solvent, especially those having a polymer concentration of 200 to 1,000 g/liter and a polymer bulk density of 0.3 to 0.53 kg/liter.

To illustrate the method of this invention more clearly, various embodiments are shown in FIG. 5.

In operation A the degree of the valve opening is set at MV1 within range II for the time $t_1$ and at MV2 within range III for the time $t_2$, and this operation is periodically repeated. When the slurry is excessively discharged (for example, when the liquid level in a vessel on the upstream side tends to drop, or when the surface level of the receiving vessel tends to rise), the valve may be closed to stop the discharge temporarily.

Figure 5A:
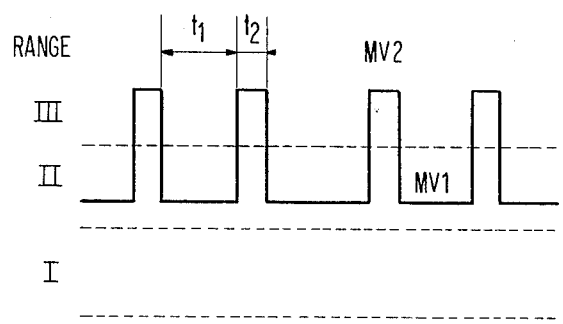
FIG. 5 shows embodiments of the method of discharging a polymer slurry in accordance with the present invention, with 5(A) through 5(E) showing alternative methods of operating the valve with respect to time and degree of opening.
Figure 5B:
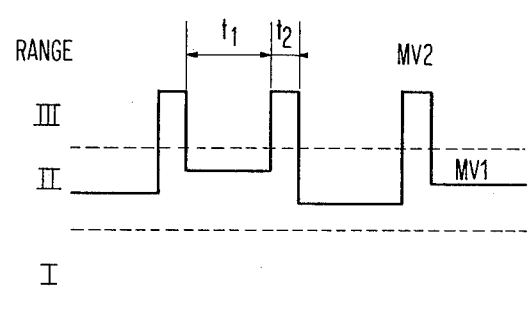
Figure 5C:
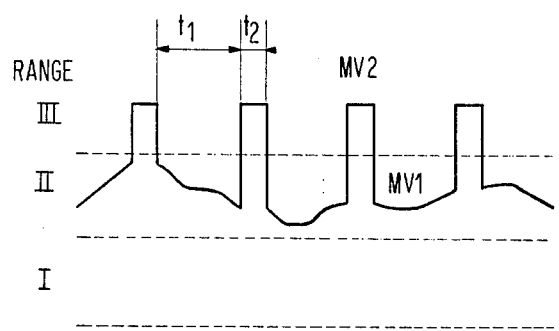
Figure 5D:
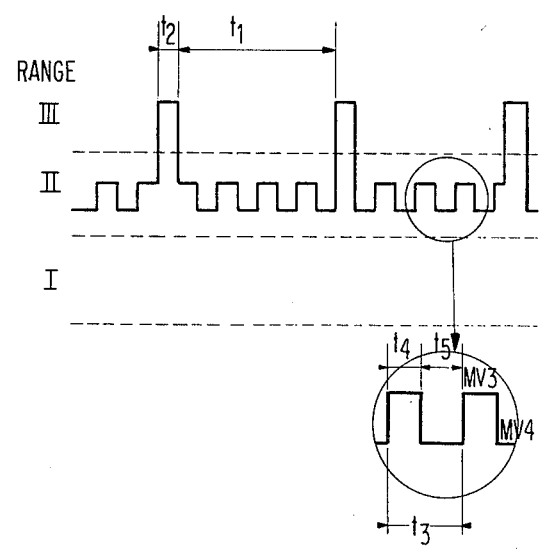
Figure 5E:
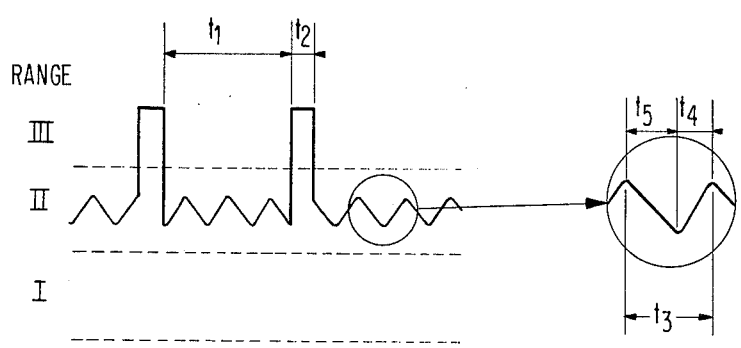

In operation B the degree of the valve opening during $t_1$ is set so that the conditions of the vessel on the upstream side become constant, for example, the liquid level in the upstream vessel becomes constant (the degree of valve opening must be maintained constant during the time $t_1$). Thus, as shown in FIG. 5(B) the degree of the valve opening during $t_1$ may be different from one period to the next.

In operation C the degree of the valve opening during the time $t_1$ is continuously adjusted by means of an adjusting meter or the like so that the conditions in the upstream vessel are maintained constant.

Operation D is carried out in accordance with any of operations A, B or C, in which clogging during operation in range II is further reduced by changing the degree of the valve opening in range II during $t_1$ in short cycles. For example, the degree of valve opening is set at MV3 during the time $t_4$, MV4 during the time $t_5$ within range II, and after the passage of $t_1$, the valve is set at MV2 within range III during the time $t_2$, and this operation is repeated periodically.

Operation E is performed in accordance with operation D, in which the degree of the valve opening during $t_1$ is varied in shorter cycles substantially continuously by decreasing the speed of the variation in the degree of the valve opening. This makes it possible to discharge a slurry of more uniform composition.

In the above methods, $t_1$ is from 5 to 60 seconds, preferably from 10 to 30 seconds; $t_2$ is from 1 to 10 seconds, preferably from 1 to 3 seconds; preferably, $t_1$ is greater than $t_2$; $t_3$ and $t_4$ plus $t_5$ are not more than 1 minute, preferably from about 5 seconds to about 15 seconds; and the difference between the degrees of valve opening MV3 and MV4 is preferably 10 to 20% within the range II.

By the aforesaid methods, the polymer slurry can be discharged smoothly. Some sign of clogging may be seen depending upon the characteristics of the polymer slurry, such as the polymer concentration on the particle size of the polymer when the discharging is continued for a long period of time. In such a case, the sign of clogging of the valve should be judged by some method, for example by a change in the flow rate or the pressure of the slurry on the downstream side, and should be corrected by changing $t_1$, $t_2$ or the degree of valve opening within the aforesaid ranges, namely by taking one or more of the following procedures:

(1) prolonging $t_2$,
(2) increasing the degree of valve opening during $t_2$,
(3) shortening $t_1$.

Operations A, B and C described above can be basically regarded as equivalent. It is noteworthy, however, that operations D and E produce a greater effect of preventing clogging of the valve by the polymer slurry over a long period of time than the operations A, B and C.

It has been found that operations D and E produce a pulsating motion in the polymer slurry in the neighborhood of the valve rod, which is most susceptible to clogging, by frequently varying the degree of valve opening periodically within range II, and therefore, clogging does not easily occur in the valve.

The invention is illustrated more specifically below by the following examples which should not be construed as limiting the scope of the invention.

REFERENCE EXAMPLE 1

An experiment was conducted on the discharge of a polypropylene slurry from a polymerization vessel using liquid propylene as a solvent.

The polypropylene slurry discharged from the polymerization vessel contained polypropylene having an average particle diameter of 500μ in a concentration of 500 g/liter of propylene. The pressure of the polymerization vessel was 30 kg/cm$^2$.G, and the pressure on the downstream side was 0.5 kg/cm$^2$.G. An angle valve (size; 2 inches) having equal percent-type flow characteristics was provided in the discharge line below the polymerization vessel. This discharge valve was incorporated with a level control loop for the polymerization vessel, and was adapted to periodically vary the degree of valve opening by a simple sequence device.

As a result of the experiment using the above facilities the following results were obtained.

(1) When the degree of valve opening was less than 50% the discharge of the polymer slurry immediately failed.

(2) When the degree of valve opening was more than 85%, no sign of clogging was observed by measuring the flow rate during a 20 second period.

(3) When the degree of valve opening was 80% a slight sign of clogging was observed by measurement of the flow rate, and in about 20 seconds, there was a marked sign of clogging.

Accordingly, for the polymer slurry used in this experiment, ranges I, II and III for the discharge valve attached to the aforesaid apparatus can be taken as less than 50% (range I), 55 to 80% (range II), and more than 85% (range III).

EXAMPLE 1

By using the same facilities as used in Reference Example 1, operation A shown in FIG. 5 was performed under the following conditions.

| | |
|---|---|
| $t_1$ = 15 seconds | MV1 = 80% (range II) |
| $t_2$ = 1 second | MV2 = 90% (range III) |

The rate of slurry discharge was 34 m³/hr, and the discharge was smooth.

EXAMPLE 2

Example 1 was repeated except as noted below.

| | |
|---|---|
| $t_1$ = 10 seconds | MV1 = 60% (range II) |
| $t_2$ = 1.5 seconds | MV2 = 90% (range III) |

The rate of the slurry discharged was 20 m³/hr, and the discharging was smooth.

EXAMPLE 3

Using the same facilities as used in Reference Example 1, operation E shown in FIG. 5 was performed under the following conditions.

| | |
|---|---|
| $t_1$ = 30 seconds | |
| $t_2$ = 1 second | MV2 = 90% (range III) |
| $t_4$ = 4 seconds | MV3 = 65% (range II) |
| $t_5$ = 5 seconds | MV4 = 55% (range II) |

The rate of the slurry discharged was 15 m³/hr.

What is claimed is:

1. A method for discharging through a discharge valve a slurry containing polymer particles having an average particle diameter of 0.1 to 1 mm suspended therein, wherein the valve is so operated that the degree of the valve opening is set within a range II for a valve operating time $t_1$ and within a range III for a valve operating time $t_2$, and this operation is repeated periodically; the time $t_1$ being from 5 to 60 seconds, the time $t_2$ being from 1 to 10 seconds, the range II being a range at which the valve is gradually clogged with the polymer particles discharged and the range III being a range at which the valve permits continuous discharge without clogging.

2. The method of claim 1, wherein the degree of valve opening during the time $t_1$ is different from one cycle to the next or the degree of valve opening during the time $t_1$ is the same during each cycle.

3. The method of claim 1, wherein the degree of valve opening during the time $t_1$ is continuously varied during the time $t_1$.

4. The method of claim 1, wherein the degree of the valve opening during the time $t_1$ is varied within range II in short cycles during the time $t_1$.

5. The method of claim 4, wherein the degree of the valve opening during the time $t_1$ is varied substantially continuously within range II in short cycles during the time $t_1$.

6. The method of claim 1, 2, 3, 4 or 5, wherein the time $t_1$ is from 10 to 30 seconds, and the time $t_2$ is from 1 to 3 seconds.

* * * * *